(12) United States Patent
Schubert et al.

(10) Patent No.: US 8,869,412 B2
(45) Date of Patent: Oct. 28, 2014

(54) WORK-TOOL POSITIONING SYSTEM AND METHOD

(71) Applicant: OTL Dynamics LLC, Vashon Island, WA (US)

(72) Inventors: Richard S. Schubert, Vashon Island, WA (US); Robert P. Donker, Vashon Island, WA (US)

(73) Assignee: OTL Dynamics LLC, Vashon Island, WA (US)

( * ) Notice: Subject to any disclaimer, the term of this patent is extended or adjusted under 35 U.S.C. 154(b) by 224 days.

(21) Appl. No.: 13/623,781

(22) Filed: Sep. 20, 2012

(65) Prior Publication Data

US 2014/0075768 A1    Mar. 20, 2014

(51) Int. Cl.
*G01B 7/31*   (2006.01)

(52) U.S. Cl.
USPC ............................................. 33/334; 702/150

(58) Field of Classification Search
USPC .................. 33/334, 354, 365, 613, 626, 645, 33/366.11; 702/150
See application file for complete search history.

(56) References Cited

U.S. PATENT DOCUMENTS

| | | | | |
|---|---|---|---|---|
| 4,295,279 A | * | 10/1981 | Sienknecht | 33/334 |
| 6,898,860 B2 | * | 5/2005 | Wu | 33/334 |
| 7,752,763 B2 | * | 7/2010 | Yamamoto | 33/334 |
| 7,874,077 B2 | * | 1/2011 | Borinato | 33/334 |
| 2002/0133959 A1 | * | 9/2002 | Bone et al. | 33/334 |
| 2004/0216314 A1 | * | 11/2004 | Ch Fung et al. | 33/334 |
| 2005/0171714 A1 | * | 8/2005 | Ely et al. | 702/150 |
| 2014/0007442 A1 | * | 1/2014 | Pettersson et al. | 33/626 |
| 2014/0019083 A1 | * | 1/2014 | Nakaoka | 702/150 |

\* cited by examiner

*Primary Examiner* — G. Bradley Bennett
(74) *Attorney, Agent, or Firm* — Orrick, Herrington & Sutcliffe LLP

(57) ABSTRACT

One embodiment includes a positioning device configured to couple with a first work-tool device coupling portion, receive an indication of coupling with a first work-tool, detect a first leveling status of the positioning device, wirelessly communicate the detected first leveling status of the positioning device, couple with a second work-tool device coupling portion, receive an indication of coupling with a second work-tool, detect a second leveling status of the positioning device and wirelessly communicate the detected second leveling status of the device. An embodiment may further include a display device configured to wirelessly receive a first leveling status from the positioning device, display a first work-tool working-axis leveling status based on the first leveling status, wirelessly receive a second leveling status from the positioning device, and display a second work-tool working-axis leveling status based on the second leveling status.

16 Claims, 8 Drawing Sheets

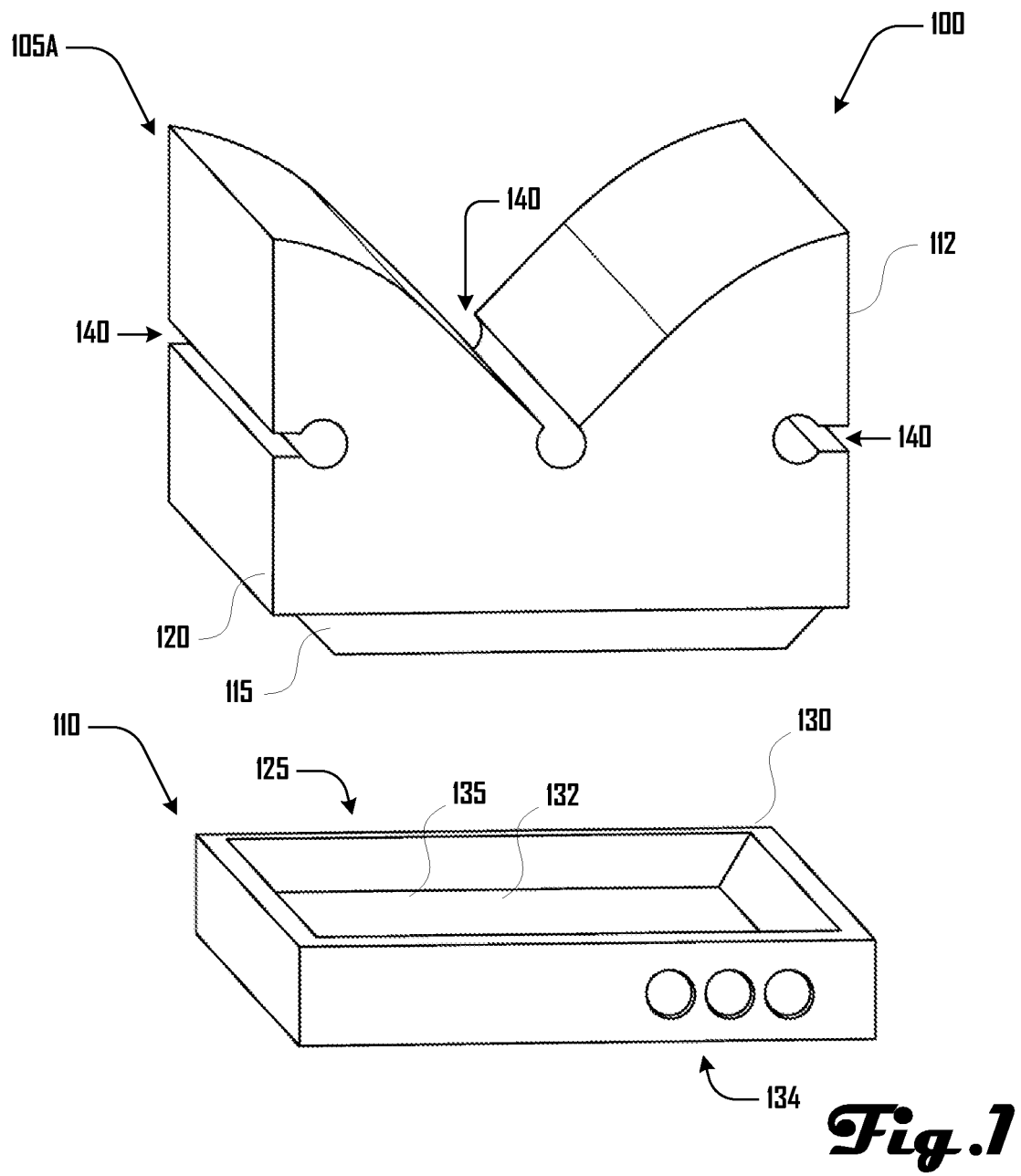

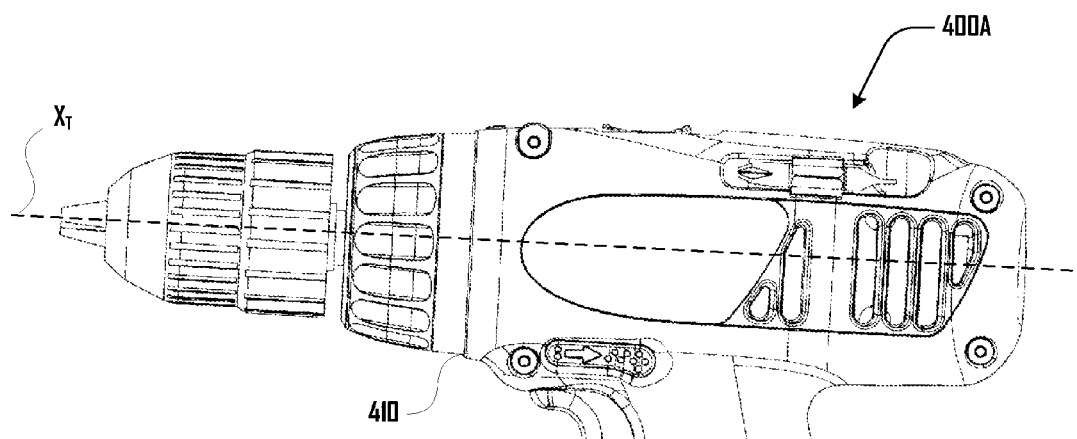
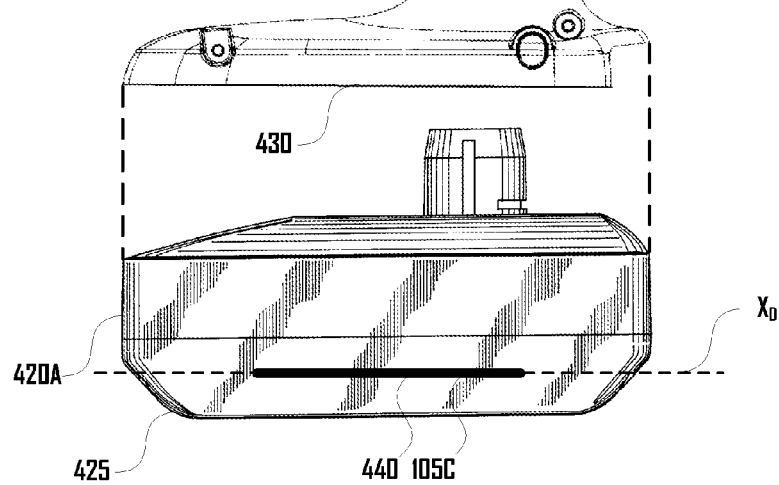
Fig.4a

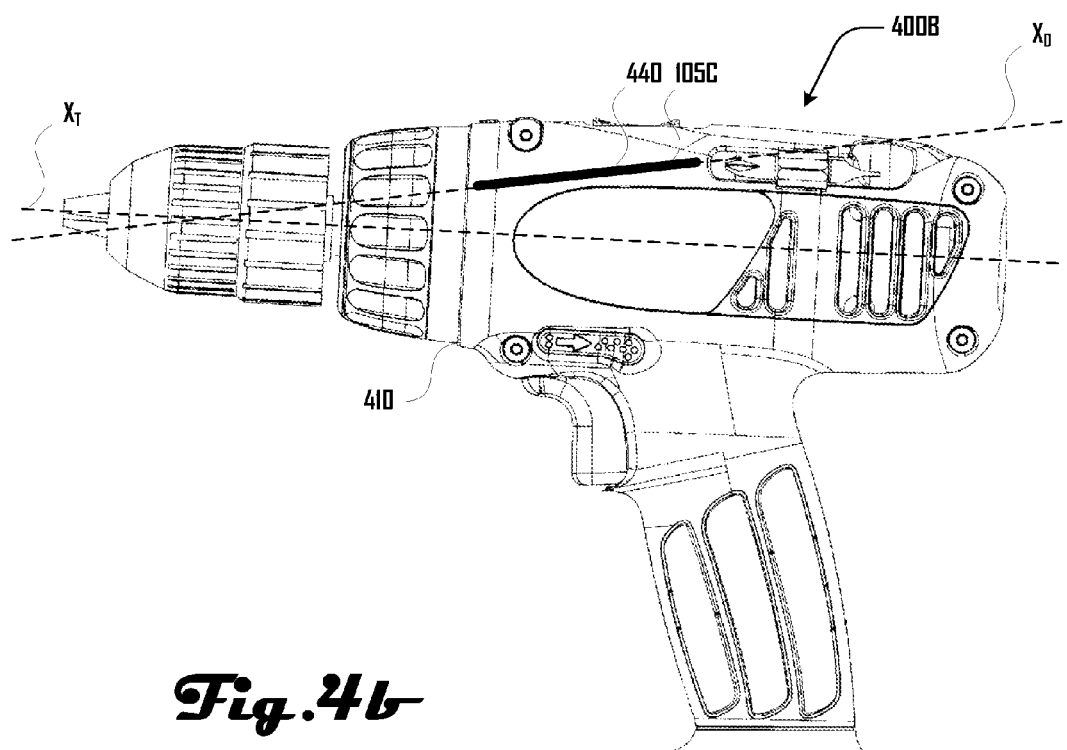
Fig.4b
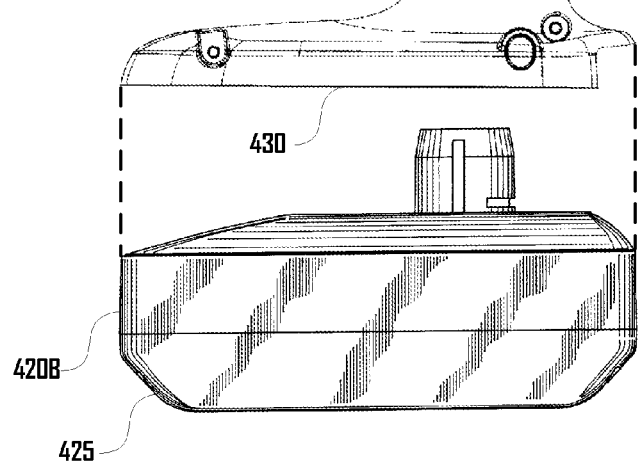

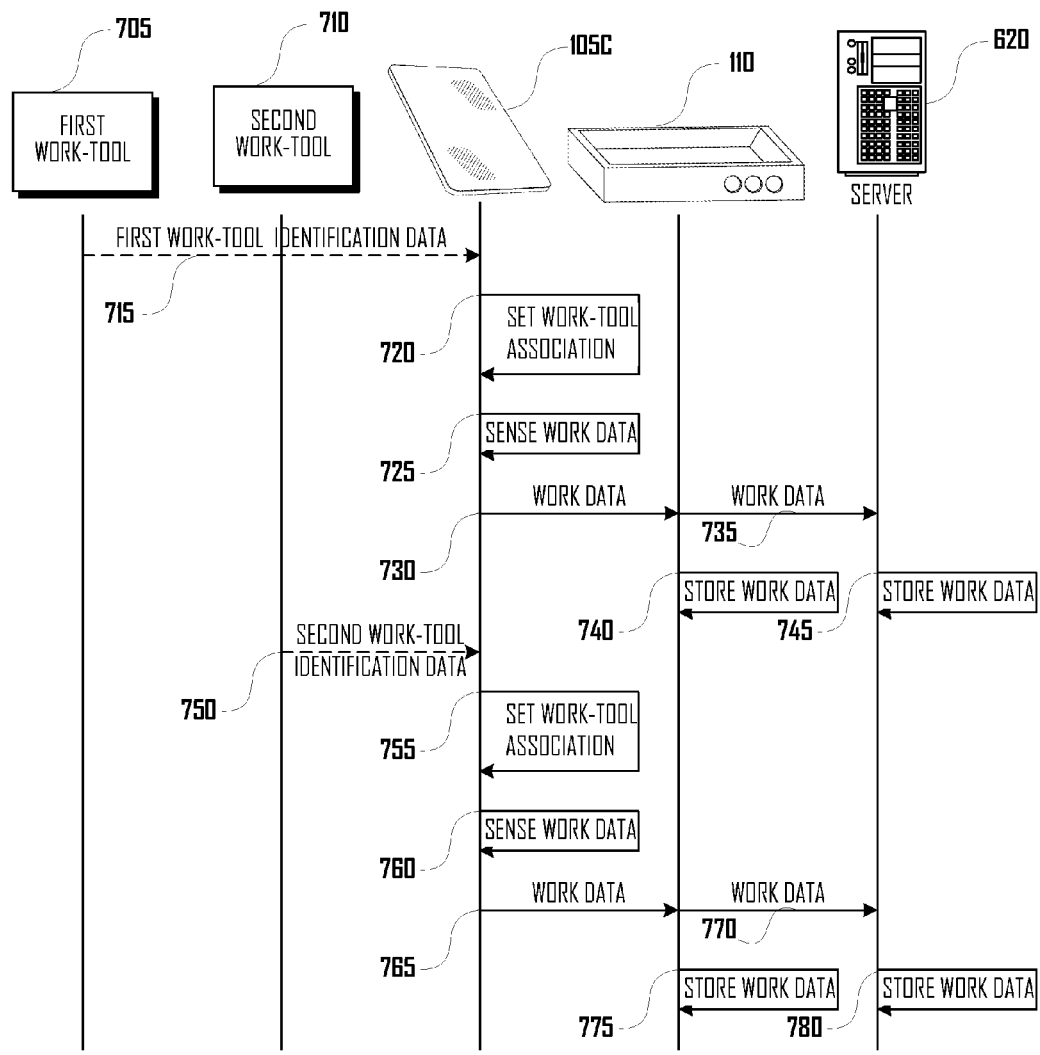

WORK-TOOL POSITIONING SYSTEM AND METHOD

RELATED APPLICATIONS

This application is related to U.S. Non-provisional application Ser. No. 13/212,989 filed on Aug. 18, 2011 which claims benefit of U.S. Non-provisional application Ser. No. 12/724,326 filed on Mar. 15, 2010 which application claims the benefit of priority of U.S. Provisional Application No. 61/159,968 filed on Mar. 13, 2009, all of which applications are incorporated herein by reference in their entireties for all purposes.

BACKGROUND

Leveling is the positioning of a plane of an object perpendicular to the gravitational axis of the earth; whereas a plane is plumb when it is parallel to the earth's gravitational axis. For example, in a household setting, people typically prefer to level pictures, mirrors, and other framed objects so that these objects are parallel to the floor, ceiling and walls of a house, which are presumed to be level themselves. In a construction setting, numerous structural elements must be leveled to satisfy building codes and esthetic preferences. For example, as discussed above, leveling of framed objects requires that structures of a home be themselves level, which must be done during construction. Additionally, leveling may be important when working with tools so that cuts, holes or other modifications of a work-piece are correctly made.

Positioning may include the placement of an object, which may include its position in three dimensional space, or a rotational orientation. In some situations, positioning may include leveling. An example of positioning may include locating an object a certain distance from another object, orienting an object toward a compass point, locating the object a certain distance from sea level or ground level, and the like.

Various devices and methods can be used to level or position an object or work-tool. One exemplary leveling device is a bubble or spirit level, which is a transparent and slightly curved vial that is incompletely filled with liquid. A bubble in this vial settles to the center of the vial when the vial is level.

While this is a typical device used to level or plumb objects, it is deficient because a user must be able to see the position of the bubble in order to properly use the instrument, and being at a distance, at certain angles, and having an obstructed view makes bubble levels unusable. Unfortunately, this substantially limits the use of such a device in many settings.

Although some work-tools may include a level, work-tools do not typically allow for robust positioning work-data to be generated and used because such functionalities would be prohibitively expensive to be included in numerous work-tools. However, workers may benefit from real-time positioning data and an easily visible graphical representation of such positioning data when using a plurality of work-tools.

BRIEF DESCRIPTION OF THE DRAWINGS

The present invention will be described by way of exemplary embodiments illustrated in the accompanying drawings in which like references denote similar elements, and in which:

FIG. 1 is a perspective view of a positioning system in accordance with an embodiment.

FIG. 4a is a side view of a power drill with a battery pack configured to couple with a positioning device, in accordance with an embodiment.

FIG. 4b is a side view of a power drill configured to couple with a positioning device, in accordance with an embodiment.

FIG. 7 is a data-flow diagram of communications between devices of a leveling and positioning system in accordance with an embodiment.

SUMMARY

Figure 2A:
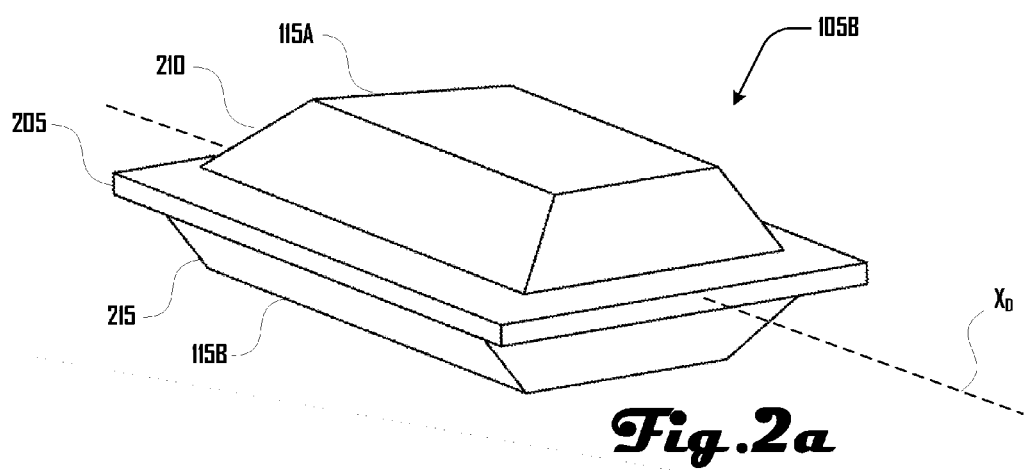
FIG. 2a is a perspective view of a positioning device in accordance with an embodiment.

This invention relates generally to leveling and positioning, and more specifically, to systems and methods for leveling and positioning. One embodiment includes a first work-tool having a first work-tool working-axis and a first work-tool device coupling portion having a first holding orientation relative to the first work-tool working-axis; a second work-tool having a second work-tool working-axis and a second work-tool device coupling portion having a first holding orientation relative to the first work-tool working-axis.

The system may further include a positioning device configured to couple with the first work-tool device coupling portion, receive an indication of coupling with the first work-tool, detect a first leveling status of the device, wirelessly communicate the detected first leveling status of the device, couple with the second work-tool device coupling portion, receive an indication of coupling with the second work-tool, detect a second leveling status of the device and wirelessly communicate the detected second leveling status of the device.

The system may further include a display device configured to wirelessly receive a first leveling status from the positioning device, display a first work-tool working-axis leveling status based on the first leveling status, wirelessly receive a second leveling status from the positioning device, and display a second work-tool working-axis leveling status based on the second leveling status.

A further embodiment includes a method of work-tool positioning that includes coupling a positioning device with a first work-tool at a first work-tool device coupling portion having a first work-tool device coupling portion axis, receiving at the positioning device an indication of coupling with the first work-tool, detecting by the positioning device a first leveling status of the positioning device about a first positioning device axis, communicating the detected first leveling status of the device to a display device and displaying at the display device an indication of the a leveling status of a first work-tool axis of the first work tool based on the detected first leveling status.

The method may further include decoupling the positioning device from the first-work tool, coupling the positioning device with a second work-tool at a second work-tool device coupling portion having a second work-tool device coupling portion axis, receiving at the positioning device an indication of coupling with the second work-tool, detecting by the positioning device a second leveling status of the positioning device about the first device axis, communicating the detected second leveling status of the positioning device to a display device, and displaying at the display device an indication of the a leveling status of a second work-tool axis of the second work tool based on the detected first leveling status.

DESCRIPTION

Illustrative embodiments presented herein include, but are not limited to, systems and methods for positioning.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The term "embodiment" is used repeatedly in the present description. The phrase generally does not refer to the same embodiment; however, it may. The terms "comprising," "having" and "including" are synonymous, unless the context dictates otherwise.

FIG. 1 is a perspective view of a positioning system 100 in accordance with an embodiment, which includes a positioning device 105A and a display device 110. The positioning device 105A comprises a housing 112, which includes a bottom extension 115 at a bottom end 120, which is configured to couple with and reside within a coupling slot 125 of the display device 110. The coupling slot 125 is defined by a plurality of sidewalls 130, which extend from a base 135. A portion of the base 135 may comprise a display 132.

The positioning device 105A and display device 110 may be configured to couple with the bottom end 120 and bottom extension 115 corresponding to the sidewalls 130 and coupling slot 125. For example, the bottom end 120 may be seated on the sidewalls 130 with the bottom end 120 extending within the coupling slot 125. Portions of the display device 110 and positioning device 105A may have corresponding dimensions and portions such that they are operable to couple or join. In some embodiments, the devices 105A, 110 may couple via magnetism, friction fit, or the like.

In some embodiments, the physical coupling of the devices 105A, 110 may allow the devices 105A, 110 to operably communicate or share power. For example, the display device 110 may charge the positioning device 105A, while the devices 105A, 110 are coupled. One or both of the devices 105A, 110 may be configured to receive power via a power cable or via inductive coupling.

The display device 110 may provide for user input in various ways. For example, the display 132 may be a touch screen, or there may be one or more buttons 134 positioned on the sidewalls 130. Further embodiments may include any suitable input structure. Additionally, the display device 110 may have one or more display 132 positioned in any suitable location on the display device 110. For example, there may be a display 132 in the coupling slot 125 on the base 135, on one or more sidewall 130 or on a bottom side of the base 135. A display 132 may be a screen or other device operable to visually convey information.

As depicted in FIG. 1 the positioning device housing 112 may comprise a plurality of slots 140, which provide for the coupling of various bands and other accessories. Such bands and accessories are discussed in related utility application Ser. No. 13/212,989 filed on Aug. 18, 2011, which is incorporated herein by reference in its entirety.

Figure 2B:
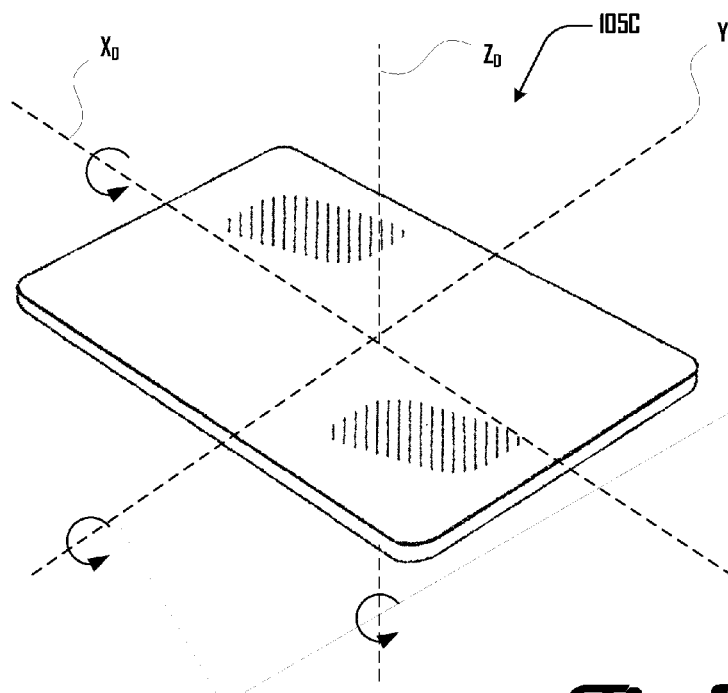
FIG. 2b is a perspective view of a positioning device in accordance with an embodiment.

Although FIG. 1 shows one embodiment of a positioning device 105A, it may assume other forms in various embodiments. For example FIGS. 2a and 2b depict two examples of a positioning device 105B, 105C in accordance with further embodiments. A general embodiment of a positioning device 105 is discussed further herein in relation to FIG. 5.

FIG. 2a depicts a positioning device 105B having a rim 205 and a top and bottom end 210, 215, which include a top and bottom extension 115A, 115B respectively. In an embodiment, the top and bottom end 210, 215 may be configured to couple with and correspond to a portion of a display device 110 as discussed in relation to FIG. 1. For example, the rim 205 and one or both of the top and bottom extension 115A, 115B may couple with and correspond to the sidewalls 130 and coupling slot 125 of a display device 110 (FIG. 1).

FIG. 2b depicts a positioning device 105C embodied as a card. FIG. 2b depicts the positioning device comprising a plurality of axes $X_D$, $Y_D$, and $Z_D$. As discussed herein, various positioning devices 100 may configured to sense position, level status, compass status, and rotation status about one or more axes. Although various figures and descriptions of the present disclosure relate to a single device axis $X_D$, further embodiments may include sensing, converting, displaying and otherwise using position data in relation to a plurality of axes (e.g., $X_D$, $Y_D$, and $Z_D$).

Similarly, although various figures and descriptions of the present disclosure relate to a single work-tool axis $X_T$ (see FIGS. 3a-3c), further embodiments may include sensing, converting, displaying and otherwise using position data in relation to a plurality of tool-axes (e.g., $X_T$, $Y_T$, and $Z_T$).

A positioning device 105A, 105B, 105C (e.g., FIGS. 1 and 2) may be configured to couple with one or more work-tools 305, 310, 315, 400A, 400B as depicted in FIGS. 3a, 3b, 3c, 4a and 4b respectively. For example, a portion of the positioning device 105A, 105B may correspond to a work-tool device coupling portion 320. Such a correspondence may be analogous to the correspondence between the positioning device 105A, 105B and the display device 110 as discussed herein. The coupling of positioning device 105A, 105B, 105C with a work-tool device coupling portion 320 may operably couple the work-tool 305, 310, 315, 400A, 400B and the positioning device 105A, 105B, 105C. For example the work-tool 305, 310, 315, 400A, 400B and the positioning device 105A, 105B, 105C may share data and power when coupled via the work-tool device coupling portion 320.

Figure 3A:
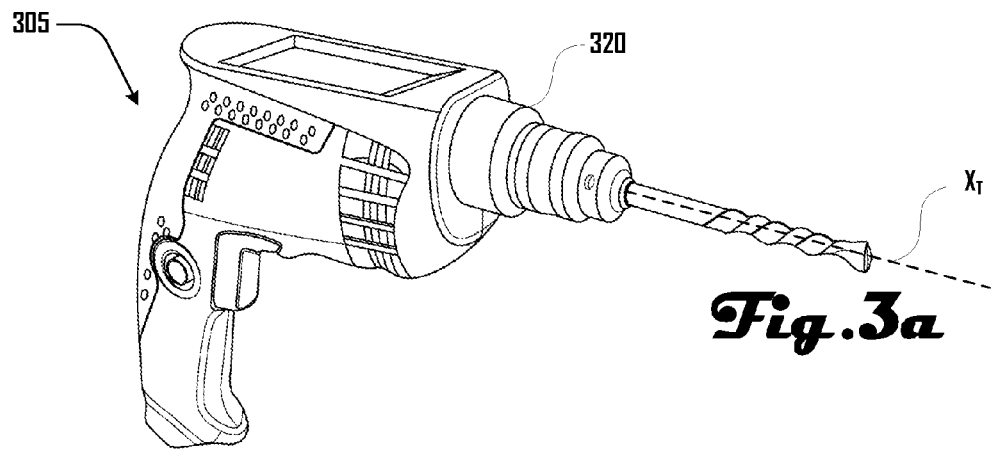
FIG. 3a is a perspective view of a power drill configured to couple with a positioning device, in accordance with an embodiment.

FIG. 3a is a perspective view of a power drill work-tool 305 configured to couple with a positioning device 105A, 105B via the work-tool device coupling portion 320. The work-tool 305 may comprise a first work-tool working-axis $X_T$, which in this embodiment may correspond to the axis of a drill bit within the chuck of the power drill work-tool 305.

Figure 3B:
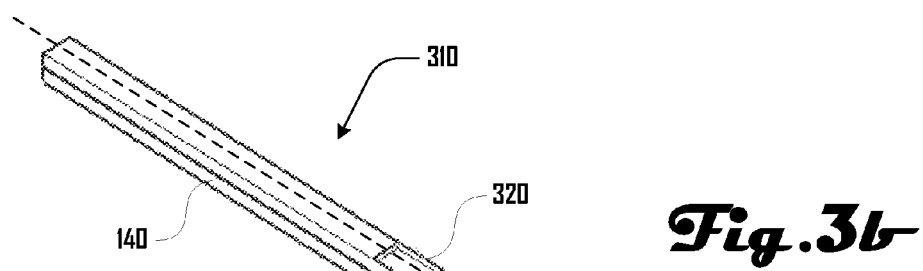
FIG. 3b is a perspective view of a level configured to couple with a positioning device, in accordance with an embodiment.

FIG. 3b is a perspective view of a level work-tool 310 configured to couple with a positioning device 105A, 105B, via the work-tool device coupling portion 320. The work-tool 310 may comprise an elongated member with slots 140 configured for coupling various bands and appliances. The work-tool 310 may comprise a first work-tool working-axis $X_T$, which in this embodiment may correspond to an axis of the elongated level work-tool 310.

Figure 3C:
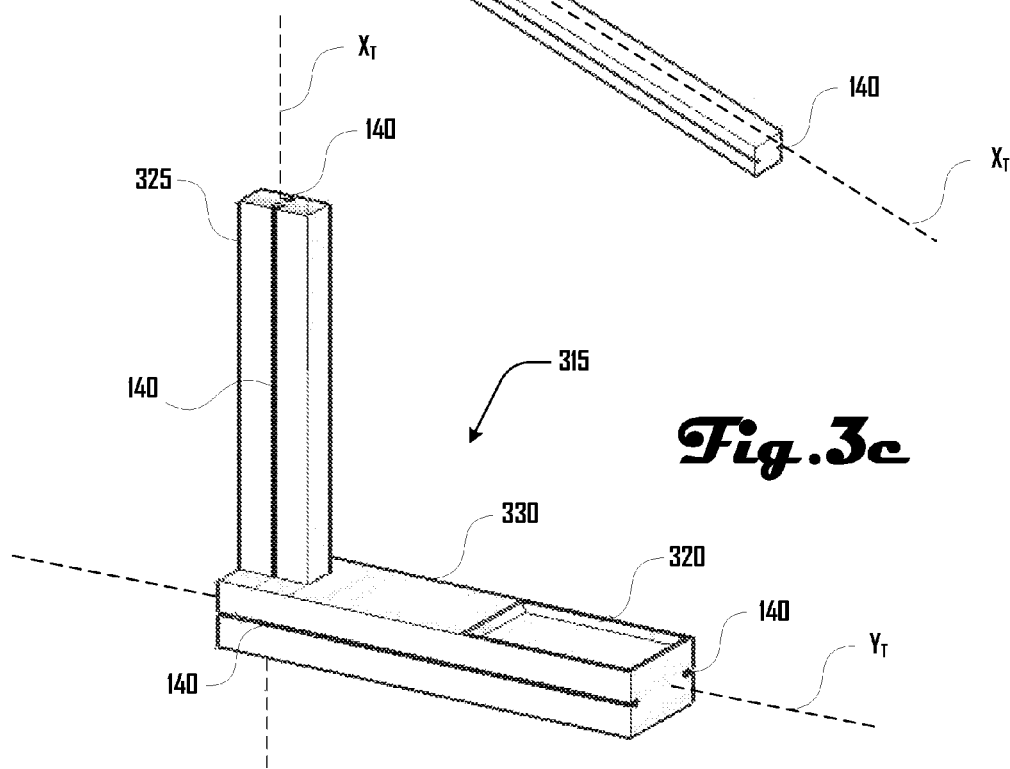
FIG. 3c is a perspective view of a framing square configured to couple with a positioning device, in accordance with an embodiment.

FIG. 3c is a perspective view of a framing square work-tool 315 configured to couple with a positioning device 105A, 105B, via the work-tool device coupling portion 320. The work-tool 310 may comprise first and second arms 325, 330 comprising slots 140 configured for coupling various bands and appliances. The work-tool 315 may comprise a first work-tool working-axis $X_T$, which in this embodiment may correspond to an axis of the first arm 325, and a second work-tool working axis $Y_T$, which may correspond to an axis of the second arm 330.

FIG. 4a is a side view of a power drill work-tool 400A with battery pack 420A configured to couple with a positioning device 105C, in accordance with an embodiment. The battery pack 420A may comprise a work-tool device coupling portion 440, which may comprise a slot in which the positioning device 105C may reside and couple. The power drill work-tool 400A may comprise a first work-tool working-axis $X_T$.

In various embodiments, the battery pack 420A may comprise a rechargeable battery with a pack housing 425 configured to removably couple with a pack-coupling portion 430 of the power drill work-tool 400A. In various embodiments a given pack housing 425 may be configured to couple with and power a family or brand of power tools. For example, companies such as Dewalt, Bosch, Crasftsman, Dremel, Makita, Miluaukee, Ryobi and Skill each have proprietary battery pack configurations.

As discussed herein, a positioning device 105C may be operable to sense leveling, position, and rotation data about one or more axis (e.g., $X_D$, $Y_D$, and $Z_D$ as shown in FIG. 2b). However, when working with a power drill work-tool 400A, the user may desire to receive a position, leveling, or rotation status relative to the first work-tool working-axis $X_T$, given that tool-axis $X_T$, corresponds to a portion of the tool 400A that is engaging a work piece. For example, the axis of a drill bit boring into a piece of wood.

In contrast, the positioning device 105C senses leveling, position, or rotation data about a device axis $X_D$, which is not parallel or otherwise coincident with first work-tool working-axis $X_T$. Accordingly, leveling, position, or rotation data may be modified so that it corresponds to leveling, position, or rotation status about first work-tool working-axis $X_T$.

For example, leveling status may be reported in radians and where axis $X_T$ and axis $X_D$ are not parallel, a defined number of radians may be added or subtracted from the detected leveling status of device axis $X_D$ so that the leveling status of tool-axis $X_T$ can be represented.

It may therefore be desirable in various embodiments to have a device 105 couple with a work-tool 400 at a position that is known relative to tool-axis $X_T$. For example, device 105C may couple with battery pack 420A at a known position within slot 440 at a holding orientation axis and the battery pack 420A may couple with the pack-coupling portion 430 at a known position relative to tool-axis $X_T$. Therefore, device-axis $X_D$ may be known relative to axis $X_T$. Because a battery pack 420A will couple with a given work-tool in a known position relative to the work-tool's work-tool axis $X_T$, the battery pack 420A can be coupled with various work-tools and the relationship between axis $X_T$ and axis $X_D$ may be known for each of these work tools (and for each desired work-tool axis).

Referring to FIG. 4b, where device 105C couples with work-tool 400B via coupling slot 320 (FIG. 3a) disposed within the work-tool body 410, the coupling position of the device 105C within the slot 440 may be known relative to work-tool axis $X_T$, and therefore the position of tool-axis $X_T$ may be known relative to device-axis $X_D$.

Similarly, where device 105B couples with work-tool 300A, 300B or 300C via coupling slot 320, the coupling position of the device 105B within the slot 320 may be known relative to work-tool axis $X_T$, and therefore the position of tool-axis $X_T$ may be known relative to device-axis $X_D$.

In various embodiments, as further discussed herein, a device 100 may receive an indication corresponding to the identity of a work-tool it is associated with, which may include an indication corresponding to the relationship of a work-tool axis $X_T$ and device axis $X_D$.

While various embodiments are described herein with a single respective work-tool axis $X_T$ and device axis $X_D$, various embodiments may include a plurality of work-tool axes $X_T$ and device axes $X_D$. Additionally, one or more of relative position, rotation, leveling status, and compass direction of a device 100 and work-tool may be detected and represented respectively. Therefore, the embodiments discussed herein should not be construed to be limiting in any way.

Figure 5:
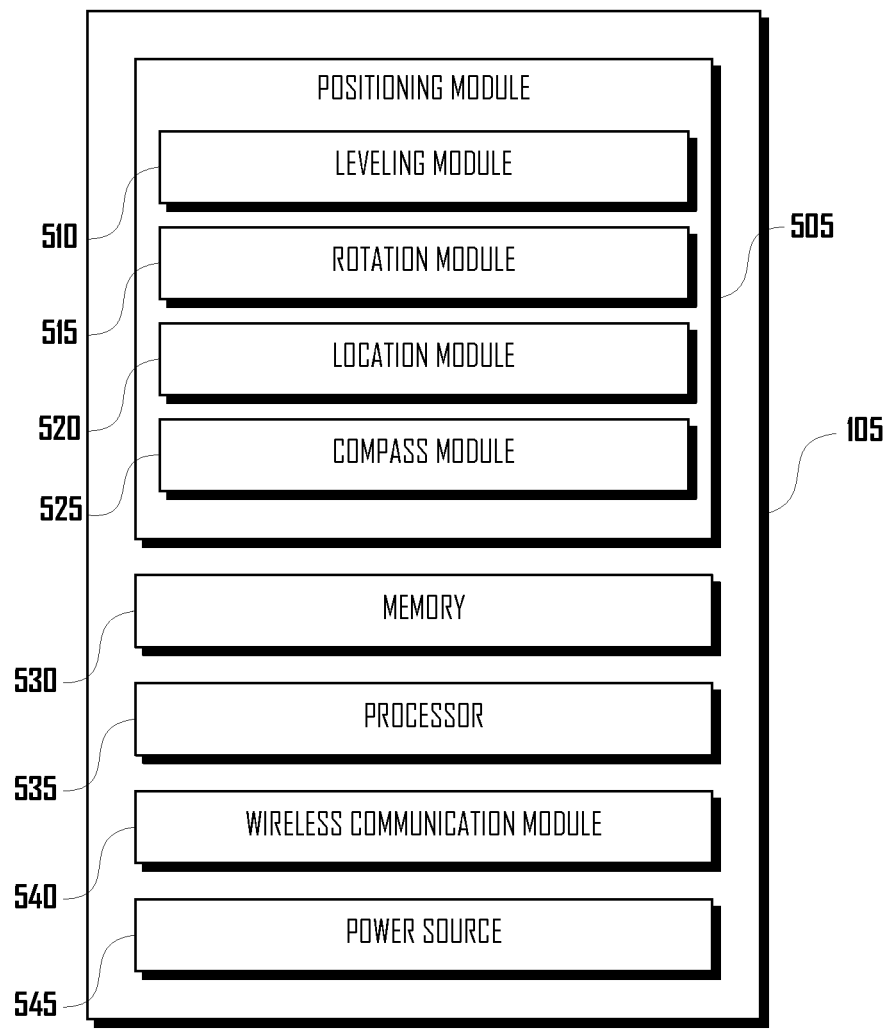
FIG. 5 is a block diagram of a positioning device in accordance with an embodiment.

FIG. 5 is a block diagram of a positioning device 105 in accordance with an embodiment. The device 105 comprises a positioning module 505, which comprises a leveling module 510, a rotation module 515, a location module 520 and a compass module 525. As discussed herein, positioning may refer to leveling, rotation, location, compass orientation, or the like. Such positioning may be in relation to one or more axis or point. In various embodiments, any of the portions of the embodiment shown in FIG. 5 may be absent, or there may be further elements (e.g., a temperature sensing module).

The leveling module 510 may comprise any suitable device operable to detect a level status. Level status may be the position of an axis relative to a line pointing toward the magnetic center of the earth. In some embodiments, level status may be relative to any other desirable frame of reference.

The rotation module 515 may comprise any suitable device operable to detect a rotation status about one or more axes (e.g., roll, pitch, yaw). Such axes may or may not be perpendicular to one another.

The location module 520 may comprise any suitable device operable to detect a position status. For example, in an embodiment, the location module 520 may comprise a global positioning system (GPS), an RFID system, or the like. Positioning may be in reference to an object such as the earth, a display device 110, a base station, a beacon, or other suitable reference point. For example, a GPS system may detect a position status, in one or more dimension, on the earth. In another example, position status may be detected in relation to another device or other suitable point of reference. In some embodiments, a positioning module 520 may use or comprise other modules in the device 105. For example, the wireless module may allow the location status to be determined via location relative to one or more wireless base-station, hub, router, or the like.

The compass module 525 may comprise any suitable device operable to detect the directional orientation of an axis relative to a given location. For example, the compass module 525 may be operable to detect the orientation of an axis relative to magnetic north, or the like.

Referring again to FIG. 5, the positioning device 105 may further comprise a memory 530, a processor 535, a wireless communication module 540, and a power source 545.

The memory 530 may be any suitable module operable to store data, including a flash memory, random access memory, or the like. In various embodiments, the memory may store positioning data generated by the positioning device 105 and modules therein. The memory 530 may store one or more identifier corresponding to a work-tool, or corresponding to the position of one or more work-tool axis $X_T$ relative to another axis. Additionally, the memory may store programs, routines, software, or the like.

In some embodiments, the wireless communication module 540 may comprise, one or more of a Bluetooth, Wi-Fi, cellular, or other suitable wireless module. Various embodiments disclosed herein may utilize one or more wireless network or wireless protocol. One or more wireless network may be used to operatively inter-connect two or more devices disclosed herein, or may be used to operatively connect one or more device disclosed herein with another suitable device, network, or server. In some embodiments, peer-to-peer wireless connections may be established comprising two or more devices.

For example, in an embodiment, a suitable network may comprise MeshDynamics™ Smart Multi-Grid™ wireless technology, such as MD4000 modular and interoperable products, or the like (MeshDynamics Inc., Santa Clara, Calif.). In one embodiment, a suitable network may comprise ZigBee™ devices, may utilize ZigBee™ protocols, or the like (ZigBee Alliance, San Ramone, Calif.). In one embodiment, a suitable network may comprise Bluetooth™ devices, may utilize Bluetooth™ protocols, or the like (Bluetooth Special Interest Group, Kirkland, Wash.).

While some example embodiment described herein may be described as using one or more specific type of network, the present disclosure should not be construed to limit the number of types of networks, wireless or otherwise, that may be employed in various embodiments. Accordingly, the example embodiments described herein merely illustrate some of the numerous possible networks that may be used, which are within the scope and spirit of the invention.

The power source 545 may comprise any suitable device operable to power the device 105. For example, the power source may be a batter 545, which may be rechargeable and/or replaceable.

Figure 6:
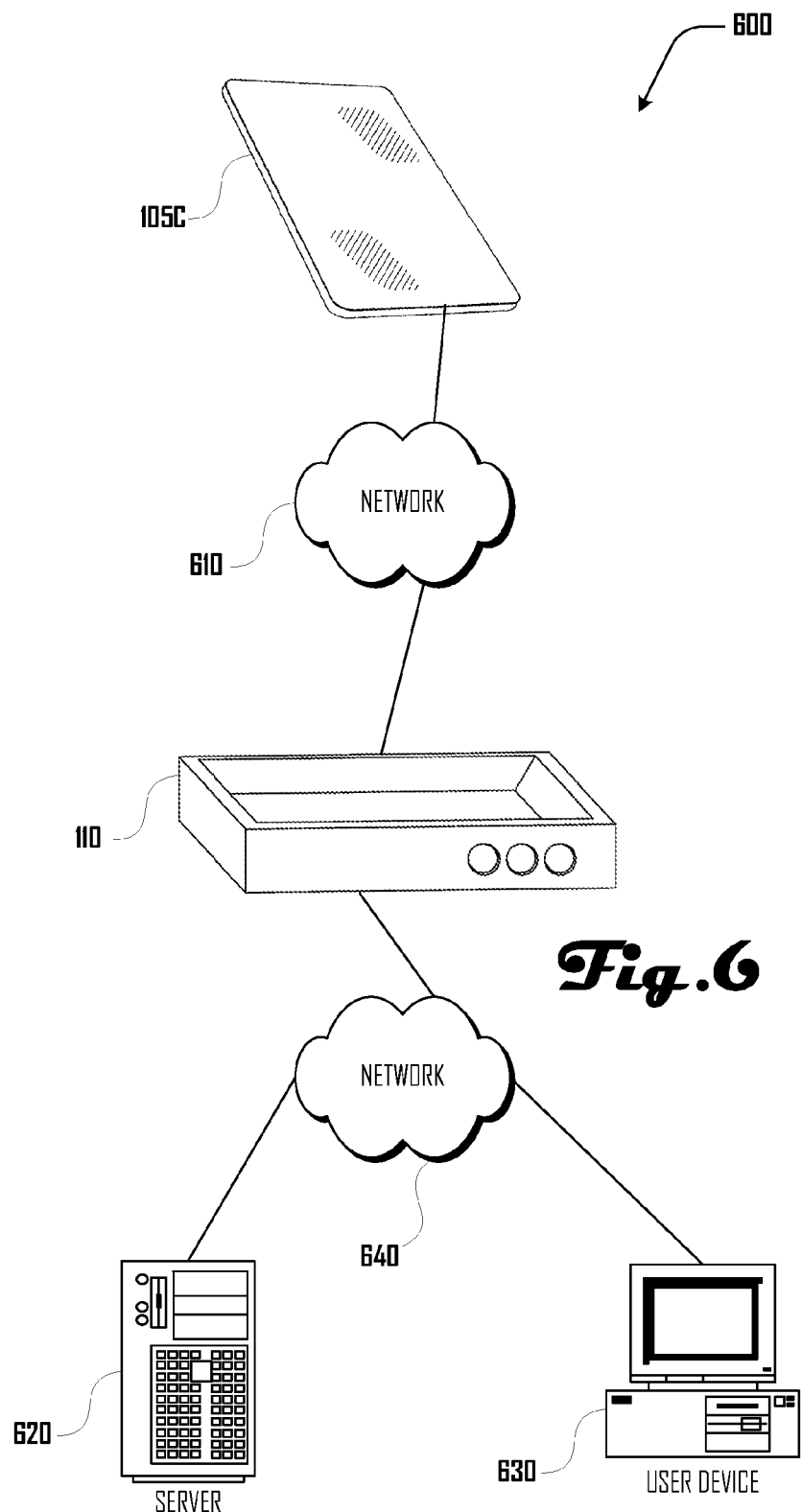
FIG. 6 is a network diagram of a leveling and positioning system in accordance with an embodiment.

FIG. 6 is a network diagram of a positioning system 600 in accordance with an embodiment, which comprises a positioning device 105C that is operably connected to a display device 110 via a first network 610. The display device is operably connected to a server 620 and a user device 630 via a second network 640. Although a device 105C in accordance with one embodiment is depicted in FIG. 6, one or more of any suitable positioning device (e.g., device 105, 105A, 105B, 105C, or the like) may be present in a positioning system 600 in various embodiments.

The server 620 may be any suitable server or computer operable to store and communicate data, which may include an internet server. The user device 630 may be various types of devices including a laptop computer, desktop computer, tablet computer, cellular telephone, gaming console, television, or the like. Although the display device 110 is shown here according to one embodiment, in some embodiments, the display device 110 may be a user device 630 or the like.

In an embodiment, the first and second networks 610, 640 may be any suitable networks. In some embodiments the first and second networks 610, 640 may be the same network or connected networks. In one embodiment, the first network 610 may be a localized or short-range wireless network such as Bluetooth or Zig-Bee and the second network 640 may be a wireless network which includes the internet.

For example, in an embodiment, there may by a plurality of devices 105C associated with work-tools 400A, 400B, and the devices 105C may be sensing positioning status of a work-tool 400A, 400B that the device 105C is associated with. The plurality of devices 105C may be wirelessly connected to the display device 110 via the first network 610, which may be a local area wireless network. Work-data, including position data, may be sent to the display device 110, where it is displayed. The display device 110 may have a graphic display of leveling status of one or more work-tool 400A, 400B, which may assist a work-tool user in operating a given work-tool 400A, 400A in a desired manner (e.g., making a level hole with a drill). The display device 110 may also display other useful graphic representations of work-data, including the position of one or more work-tools 400A, 400B relative to one another, the identity of one or more work-tools 400A, 400B, or the like.

Work-data from one or more device 105C may be communicated to one or more server 620 or user device 630. For example, work-data may be generated by a plurality of positioning devices 105 while associated with a plurality of work-tools over a period of time (as the positioning device 105 is transferred from one work-tool to another). Such work-data can be saved on a server 620 and may then be accessed by the user device 630 or display device 110. For example, a set of work-data may be accessed by a company user device 630 to audit or track work done by employees. A set of work-data may be presented which indicates which work-tools were used over a period of time with a given positioning device 105, how many actions were performed by work-tools while associated with a positioning device 105 (e.g., number of cuts, holes drilled or the like), positioning accuracy of such work-tool actions (e.g., how many actions were level, straight or the like or an indication of how accurate a set of actions were), or location of the device 105 over a period of time. Accordingly, it may be desirable to assign company workers a positioning device 105 so that an employer may track, monitor and assess the quality and quantity of work performed by each of its workers.

FIG. 7 is a data-flow diagram of communications between devices of a leveling and positioning system in accordance with an embodiment, wherein the positioning device 105C is coupled with a first work-tool 705, decoupled from the first work-tool 705 and coupled with a second work-tool 710. For example, a worker may desire to use the first work-tool 705 with the aid of the positioning device 105C and then may desire to use the second work-tool 710 with the aid of the positioning device 105C.

The communications begin with an optional communication (denoted by the dashed line), where a first work-tool 705 sends 715 device identification data to the positioning device 105C. For example, referring to FIG. 4b in an embodiment where the positioning device 105C couples with a slot 440 in the work-tool body 410, the work-tool may be configured to communicate work-tool identification data to the positioning device 105C. In an embodiment, work-tool identification data may correspond to or comprise an indication of a work-tool make and model, a work-tool serial number or MAC address, a relationship between one or more work-tool axis $X_T$ and device axis $X_D$, and the like.

However, in some embodiments, the positioning device 105C may receive work-tool identification data from another source (e.g., the display device 110) or may not receive work-tool identification data. For example, referring to FIG. 4a, in some embodiments a device 105C coupled with a battery pack 420A may not receive a work-tool identifier when the battery pack 420A is coupled or uncoupled from a given work-tool. In some embodiments, a user may select a work-tool via a display device 110 and the positioning device 105C may therefore receive a work-tool identifier via the display device 110. Receiving work-tool identification data from a display device 110 or the like may be desirable in embodiments where a positioning device 100 does not automatically receive work-tool identification data from a work-tool when the positioning device 105C couples with a work-tool.

Referring again to FIG. 7, the device 105C may set 720 work-tool association. Setting 720 work-tool association may be an indication that the device 105C is coupled with a work-tool, that the device 105C is coupled with a specific work-tool, or may include a setting to convert work-data sensed by the positioning device 105C from a positioning device axis $X_D$ to correspond to a work-tool axis $X_T$.

The positioning device 105C may sense or receive 725 work-data, and send 730 the work-data to display device 110, which may in turn send 735 the work-data to the server 620. Work-data may be stored 740, 745 at the display device 110 and the server 620. In some embodiments, work-data may be also be stored (not shown) at the positioning device 105C.

Work-data may comprise various types of data related to the operation and position of a work-tool. For example, work-data may include data regarding operation of the work tool such as RPM of a tool-motor, depression status of a tool-trigger, battery life of a work-tool battery, temperature various portions of a work tool, or the like. Additionally, work-data may comprise position data as described herein.

In another optional step, work-tool identification data may be sent 750 from a second work-tool 710 to the positioning device 105C (e.g., where the positioning device 105C is de-coupled from the first work-tool and then coupled with the second work-tool 710). The positioning device 105C may set 755 work-tool association (e.g., an association to the second work-tool 710 when the positioning device 105C is de-coupled from the first work-tool and then coupled with the second work-tool 710).

The positioning device 105C may sense 760 work-data, and send 765 the work-data to display device 110, which may in turn send 770 the work-data to the server 620. Work-data may be stored 775, 780 at the display device 110 and the server 620. In some embodiments, work-data may also be stored at the positioning device 105C (not shown).

In some embodiments, a work-tool may be configured to be operable connected to a display device 110 or the like. For example, a work-tool may be configured to wirelessly communicate with a display device 110 or the like.

For example, in an embodiment, a display device 110 may be operable to identify and locate a plurality of work-tools within proximity of the display device 110 that are operable to couple with a positioning device 100. This may be desirable because a positioning device 100 user may be able to locate work-tools that can be used with a positioning device 100, even if those work-tools are presently unknown to the worker or do not belong to the worker.

Although certain specific embodiments of work-tools are described herein including power drill work-tools 305, 400A, 400B, level work-tool 310 and square work-tool 315. Work-tools may be any suitable tool, vehicle, or the like. For example, work-tools may comprise a crane, circular saw, chainsaw, reciprocating saw, backhoe, tractor, or the like. Additionally, in some embodiments, a plurality of positioning devices 100 may be coupled with a given work-tool. For example, where a work-tool is a backhoe, a positioning device 100 may couple with the bucket of the backhoe, and another positioning device 100 may couple with the vehicle cab of the backhoe. This may be desirable because, using this example, sensing position of the bucket and cab independently may be useful when operating the backhoe.

Additionally, although specific embodiments have been illustrated and described herein, it will be appreciated by those of ordinary skill in the art and others, that a wide variety of alternate and/or equivalent implementations may be substituted for the specific embodiment shown in the described without departing from the scope of the embodiments described herein. Any embodiment discussed herein may be suitably interchanged with another embodiment, and the present disclosure should be interpreted to provide for such interchangeability. This application is intended to cover any adaptations or variations of the embodiment discussed herein. While various embodiments have been illustrated and described, as noted above, many changes can be made without departing from the spirit and scope of the embodiments described herein.

The invention claimed is:

1. A positioning system, the system comprising:
    a first work-tool comprising:
        a first work-tool working-axis; and
        a first work-tool device coupling portion having a first holding orientation axis relative to the first work-tool working-axis,
    a second work-tool comprising:
        a second work-tool working-axis; and
        a second work-tool device coupling portion having a second holding orientation axis relative to the first work-tool working-axis,
    a positioning device configured to:
        couple with the first work-tool device coupling portion;
        receive an indication of coupling with the first work-tool;
        detect a first leveling status of the device;
        wirelessly communicate the detected first leveling status of the device;
        couple with the second work-tool device coupling portion;
        receive an indication of coupling with the second work-tool;
        detect a second leveling status of the device; and
        wirelessly communicate the detected second leveling status of the device, and
    a display device configured to:
        wirelessly receive a first leveling status from the positioning device;
        display a first work-tool working-axis leveling status based on the first leveling status;
        wirelessly receive a second leveling status from the positioning device; and
        display a second work-tool working-axis leveling status based on the second leveling status.

2. The system of claim 1, wherein the first work-tool device coupling portion is a portion of a battery pack configured to removably couple with and power the first work-tool.

3. The system of claim 1, wherein the first work-tool is configured to automatically provide the positioning device a first work-tool indicator when coupled with the positioning device, the first work-tool indicator being associated with a spacial relationship between the first work-tool working-axis and the first holding orientation axis.

4. The system of claim 1, wherein the positioning device comprises a device housing, wherein the first work-tool comprises a housing, and wherein a portion of the device housing corresponds to a portion of the first work-tool housing, the portion of the first work-tool housing comprising the first work-tool device coupling portion.

5. The system of claim 4, wherein the display device comprises a display device housing, and wherein the portion of the portion of the device housing corresponding to a portion of the first work-tool housing also corresponds to a portion of the display device housing.

6. The system of claim 5, wherein the display device and positioning device are configured to operably couple via the corresponding portions of the display housing and device housing.

7. The system of claim 5, wherein the display device comprises:
 a base;
 a plurality of sidewalls extending from the base,
 a display cavity defined by the base and the sidewalls display cavity;
 a display disposed within a portion of the base and within the display cavity.

8. The system of claim 1, wherein the positioning device is configured to sense temperature.

9. The system of claim 1, wherein the positioning device is configured to detect a leveling status, a location status, and a rotation status.

10. A method of work-tool positioning, the method comprising:
 coupling a positioning device with a first work-tool at a first work-tool device coupling portion having a first work-tool device coupling portion axis;
 receiving at the positioning device an indication of coupling with the first work-tool;
 detecting by the positioning device a first leveling status of the positioning device about a first positioning device axis;
 communicating the detected first leveling status of the device to a display device;
 displaying at the display device an indication of the a leveling status of a first work-tool axis of the first work tool based on the detected first leveling status;
 decoupling the positioning device from the first-work tool;
 coupling the positioning device with a second work-tool at a second work-tool device coupling portion having a second work-tool device coupling portion axis;
 receiving at the positioning device an indication of coupling with the second work-tool;
 detecting by the positioning device a second leveling status of the positioning device about the first device axis;
 communicating the detected second leveling status of the positioning device to a display device; and
 displaying at the display device an indication of the a leveling status of a second work-tool axis of the second work tool based on the detected first leveling status.

11. The method of claim 10, wherein coupling the positioning device with a first work-tool at a first work-tool device coupling portion comprises:
 coupling the positioning device with rechargeable battery pack comprising the first work-tool device coupling portion; and
 coupling the battery pack with the first work-tool at a battery pack coupling portion.

12. The method of claim 10 further comprising the positioning device receiving first work-tool identification data while coupled with the first work tool, the first work-tool identification data corresponding to a relationship between the first work-tool device coupling portion axis and the first work-tool axis.

13. The method of claim 10 further comprising communicating the first and second leveling status from the positioning device to the display device via a first local wireless network.

14. The method of claim 13 further comprising communicating the first and second leveling status from the display device to a remote device via second wireless network that is different from the first local wireless network.

15. The method of claim 10 further comprising the display device obtaining work-tool identification data corresponding to a relationship between the first work-tool device coupling portion axis and the first work-tool axis.

16. A positioning system, the system comprising:
 a first work-tool comprising:
  a first work-tool working-axis; and
  a first work-tool device coupling portion having a first holding orientation axis relative to the first work-tool working-axis,
 a second work-tool comprising:
  a second work-tool working-axis; and
  a second work-tool device coupling portion having a second holding orientation axis relative to the first work-tool working-axis,
 a positioning device configured to:
  couple with the first work-tool device coupling portion;
  receive an indication of coupling with the first work-tool;
  detect a first positioning status of the device;
  wirelessly communicate the detected first positioning status of the device;
  couple with the second work-tool device coupling portion;
  receive an indication of coupling with the second work-tool;
  detect a second positioning status of the device; and
  wirelessly communicate the detected second positioning status of the device, and
 a display device configured to:
  wirelessly receive a first positioning status from the positioning device;
  display a first work-tool working-axis positioning status based on the first positioning status;
  wirelessly receive a second positioning status from the positioning device; and
  display a second work-tool working-axis positioning status based on the second positioning status.

* * * * *